(12) United States Patent
Hooley

(10) Patent No.: US 11,480,141 B2
(45) Date of Patent: Oct. 25, 2022

(54) SUPERCHARGER AIRFLOW INTAKE

(71) Applicant: Michael Hooley, Peoria, AZ (US)

(72) Inventor: Michael Hooley, Peoria, AZ (US)

( * ) Notice: Subject to any disclaimer, the term of this patent is extended or adjusted under 35 U.S.C. 154(b) by 0 days.

(21) Appl. No.: 17/378,675

(22) Filed: Jul. 17, 2021

(65) Prior Publication Data

US 2022/0018317 A1 Jan. 20, 2022

Related U.S. Application Data

(60) Provisional application No. 63/053,588, filed on Jul. 18, 2020.

(51) Int. Cl.
*F02M 35/10* (2006.01)
(52) U.S. Cl.
CPC ........... *F02M 35/10163* (2013.01); *F02M 35/10347* (2013.01)

(58) Field of Classification Search
CPC ........ F02M 35/10163; F02M 35/10347; F04D 29/4213
See application file for complete search history.

(56) References Cited

PUBLICATIONS

Oct. 13, 2017, MBworld, pp. 1-9 (Year: 2017).*

* cited by examiner

*Primary Examiner* — Audrey B. Walter
*Assistant Examiner* — Edward Bushard
(74) *Attorney, Agent, or Firm* — Bruce A. Lev

(57) ABSTRACT

An improved supercharger airflow intake that reduces air flow turbulence and provides an increase in the volume of airflow therethrough and into a vehicle supercharger, thereby increasing the efficiency and performance of the supercharger and thereby the engine of a vehicle.

11 Claims, 5 Drawing Sheets

SUPERCHARGER AIRFLOW INTAKE

CROSS-REFERENCE TO RELATED APPLICATION

The present application is related to and claims priority from prior provisional application Ser. No. 63/053,588, filed Jul. 18, 2020 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of high performance car engine superchargers and more specifically relates to a supercharger that offers an increase in the volume of air flow therethrough and into the engine of a car.

2. Description of the Related Art

Prior art superchargers are designed to have a specific capacity of airflow to pass therethrough. In many cases an increased volume of airflow would improve the efficiency and performance of an engine of a vehicle the supercharger is attached to. In order to increase the volume of airflow within prior art superchargers adapter plates would have to be either bolted or welded to the supercharger to allow for a larger throttle body to be attached thereto. The deficiencies of this method include having to cut sections of the existing supercharger, machining parts, welding parts together, and once together the resulting configuration sometimes blocks and interferes with other sections of the supercharger where accessories are adapted to be connected.

Thus, a need exists for an improved supercharger airflow intake to avoid the above-mentioned problems.

BRIEF SUMMARY OF THE INVENTION

In view of the foregoing disadvantages inherent in known vehicle superchargers, the present invention provides an improved supercharger airflow intake. The general purpose of the present invention, which will be described subsequently in greater detail, is to reduce air flow turbulence and provide an increase of the volume of airflow into and through an existing supercharger by incorporating a larger airflow intake that avoids restrictive curved walls and allows for a larger throttle body to be mounted to the supercharger.

The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Improved Supercharger Airflow Intake, constructed and operative according to the teachings of the present invention.

The various embodiments of the present invention will hereinafter be described in conjunction with the appended drawings.

DETAILED DESCRIPTION

As discussed above, embodiments of the present invention relate to an improved supercharger airflow intake to reduce air flow turbulence and provide an increase of the volume of airflow into an existing supercharger by incorporating a larger airflow intake that avoids restrictive curved walls and allows for a larger throttle body to be mounted to the supercharger, to thereby increase the efficiency and performance of the supercharger and thereby the engine of a vehicle.

Figure 1:
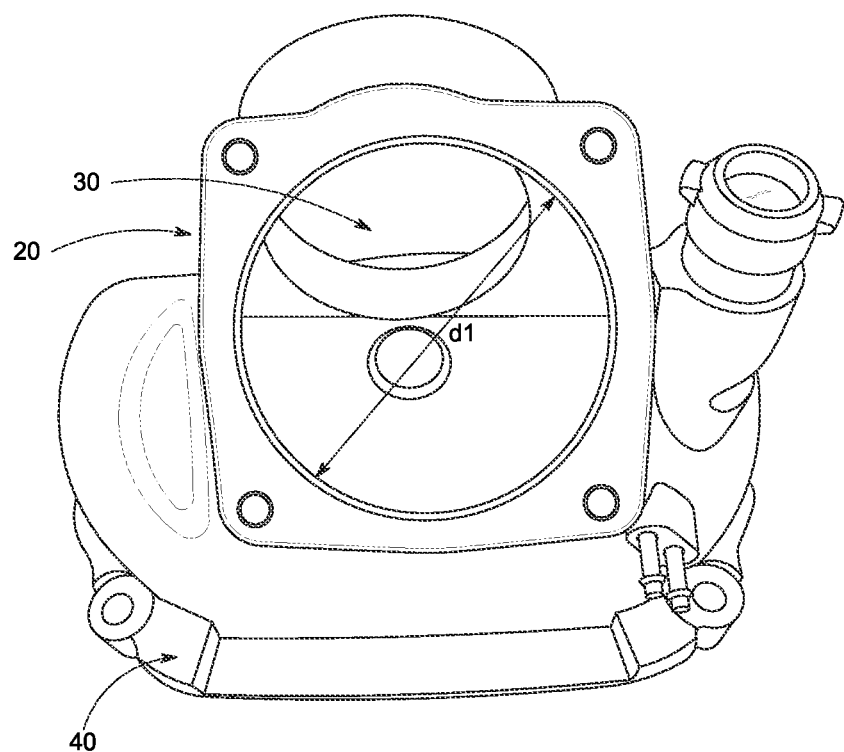
FIG. 1 shows a front view of a prior art supercharger airflow intake.
Figure 2:
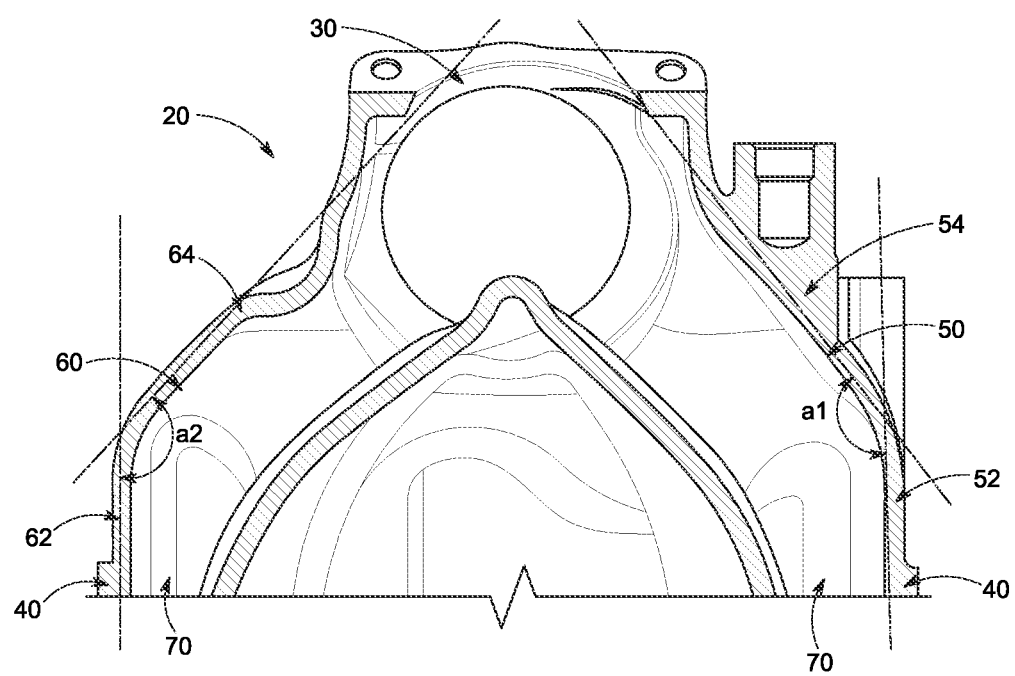
FIG. 2 shows a front sectional view of the prior art supercharger airflow intake of FIG. 1.

FIGS. 1 and 2 show a prior art supercharger airflow intake 20 that includes an industry standard sized rear intake snout 30 having a diameter d1, a flat horizontally extending mounting flange 40, and an outflow aperture 70. Referring to the front sectional view of FIG. 2, the right side interior wall 50 has a shape including a first portion 52 that extends vertically from the mounting flange 40 at an angle of 90 degrees from horizontal, and a second portion 54 that extends from the first portion 52 to the intake snout 30 at an angle a1 of approximately 50 degrees thereto and includes a plurality of curved sections there along. And, the left side interior wall 60 has a shape including a first portion 62 that extends vertically from the mounting flange 40 at an angle of 90 degrees from horizontal, and a second portion 64 that extends from the first portion 62 to the intake snout 30 at an angle a2 of approximately 50 degrees thereto and includes a plurality of curved sections there along. This configuration, the angle of the interior walls, and the shapes associated therewith create a lot of air turbulence when the air flows from the rear intake snout 30 to the outflow aperture 70, which reduces the volume and speed of the airflow therethrough, and which reduces the efficiency of the supercharger airflow intake.

Figure 3:
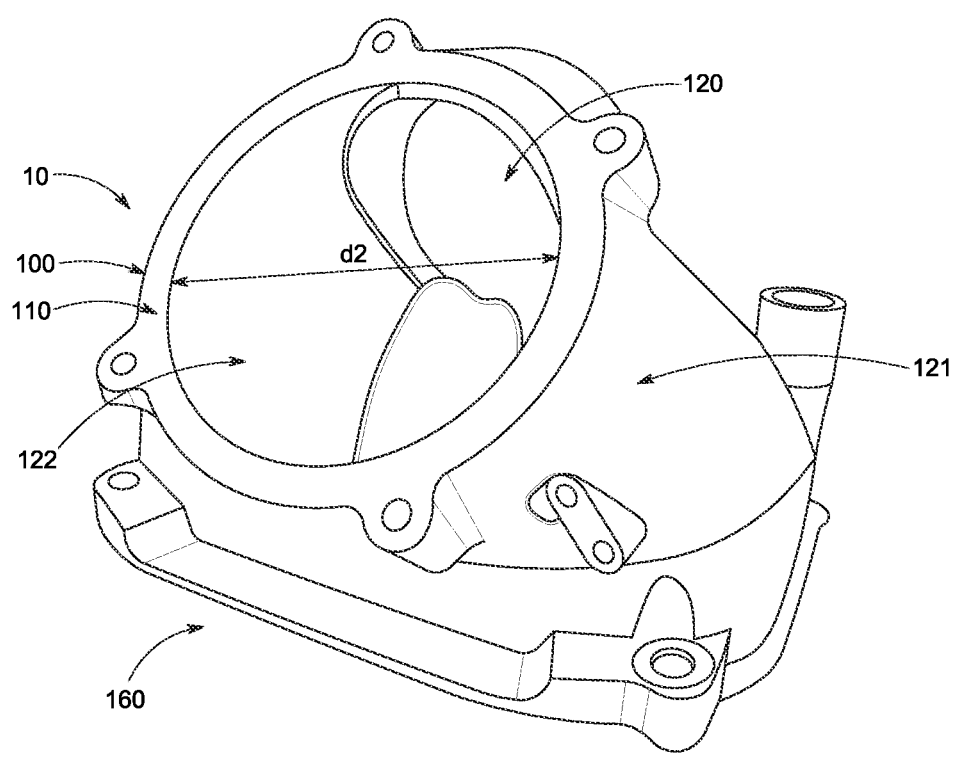
FIG. 3 shows the improved supercharger airflow intake according to the preferred embodiment of the present invention.
Figure 4:
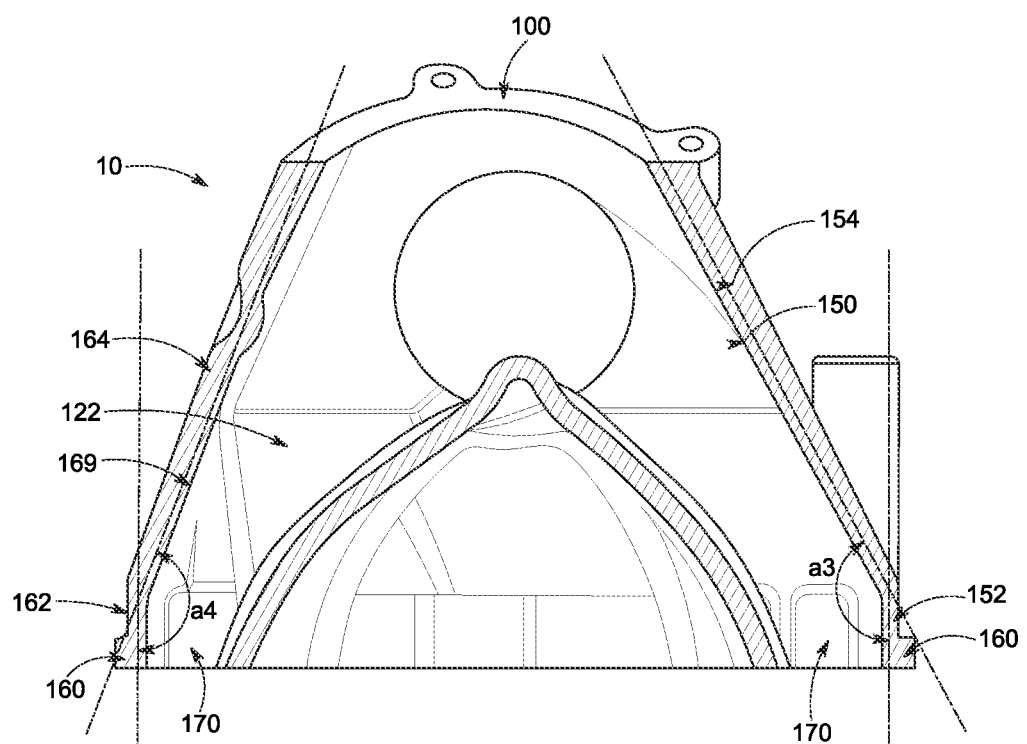
FIG. 4 shows a front sectional view of the improved supercharger airflow intake of FIG. 3.
Figure 5:
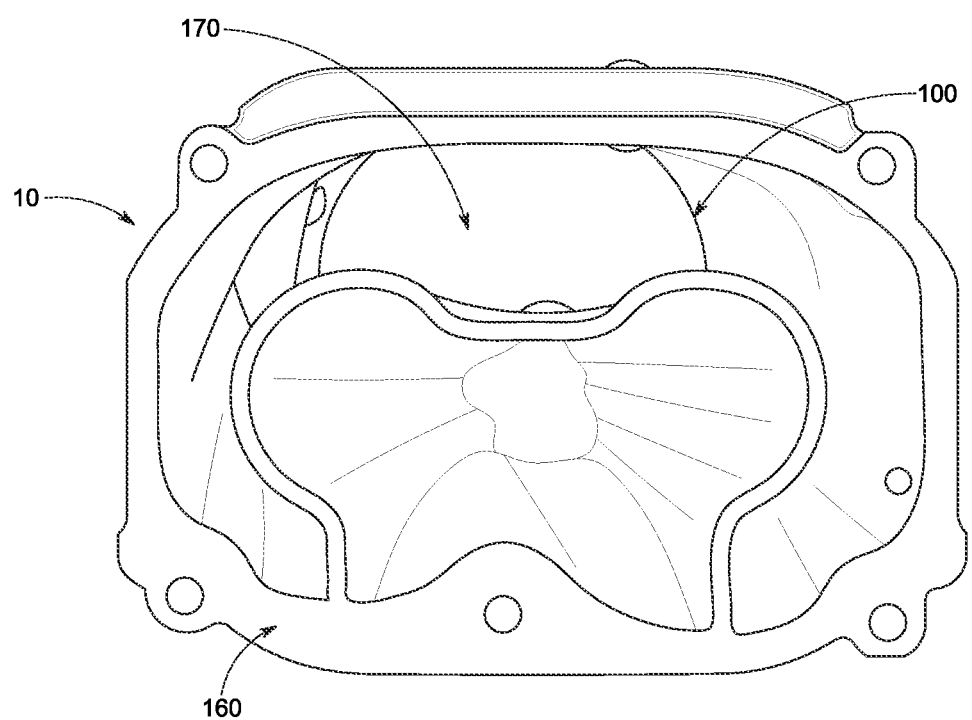
FIG. 5 shows a bottom view of the improved supercharger airflow intake of FIG. 3.

Referring to FIGS. 3-5, the improved supercharger airflow intake 10 includes a rear supercharger intake snout 100, a main body wall 121, a throttle body opening mounting flange 110 having an airflow intake 120 that has a diameter d2 that is larger than the prior art supercharger rear intake snout 30 diameter d1 to thereby increase the airflow volume into and through the rear supercharger snout 100. The increase in airflow increases the efficiency and performance of a car engine. The interior walls 122 of airflow intake 120 are formed having a more gradual angle from its mounting flange 160 up to its throttle body mounting flange 110. The gradual angle increases the amount of airflow volume the supercharger intake snout can handle and reduces air turbulence when passing therethrough. The instant configuration gradually extends from the larger throttle body opening mounting flange 110 and extends in an outward fashion to the mounting flange 160 that mounts to a supercharger of an engine. When in use the instant configuration avoids and does not interfere with any of the locations for OEM accessories to be reconnected in their stock location on the existing motor.

Referring to the front sectional view of FIG. 4, the improved supercharger airflow intake 10 includes the rear supercharger intake snout 100, the flat horizontally extending mounting flange 160, and an outflow aperture 170. The supercharger airflow intake 10 further includes a main body wall 121 formed in a shape that includes a right side interior wall 150 having a shape including a first portion 152 that extends vertically from the mounting flange 160 at an angle of 90 degrees from horizontal, and a second portion 154 that extends from the first portion 152 to the intake snout 100 at an angle a3 of between 59 degrees and 65 degrees thereto and has a relatively straight and smooth inner surface there along. And, a left side interior wall 169 has a shape including a first portion 162 that extends vertically from the mounting flange 160 at an angle of 90 degrees from horizontal, and a second portion 164 that extends from the first portion 162 to the intake snout 100 at an angle a4 of between 67 degrees and 73 degrees thereto and has a relatively straight and smooth inner surface there along. The intake snout 100 is generally circular while the outflow aperture 170 forms an oblong shape. This configuration, the angle of the interior walls, and the shapes associated therewith form a conical-type shape that creates very little air turbulence when the air flows from the rear intake snout 100 to the outflow aperture 170, which increases the volume and speed of the airflow therethrough, and which increases the efficiency of the supercharger airflow intake.

Referring to bottom view of FIG. 5, the improved supercharger airflow intake 10 includes the rear supercharger intake snout 100, the flat horizontally extending mounting flange 160, the outflow aperture 170. It should be noted that the mounting flange 160 defines the part of the shape of the outflow aperture 170, which can be described as being oblong.

It should be noted that there is a smooth transition between the right side interior wall 150 and the left side interior wall 169 of the main body wall 121, thereby forming the overall shape of the interior of the main body wall 121. This shape, along with the shape of the rear supercharger intake snout 100 and the outflow aperture 170 form the conical-type shape that creates very little air turbulence when the air flows therethrough.

In a preferred embodiment the improved supercharger airflow intake 10 is formed as one piece using 3D printing. However, the improved supercharger airflow intake 10 can also be formed from a molding process. The improved supercharger airflow intake 10 may be formed from a material chosen from a group of materials including stainless steel, iron, aluminum, composite resins, plastic, and ceramic.

In the preferred embodiment of the improved supercharger airflow intake, the diameter of the airflow intake snout is 3.67 inches; the second portion of the right side interior wall extends from the first portion at an angle of 62.11 degrees; and the second portion of the left side interior wall extends from the first portion at an angle of 69.61 degrees. Furthermore, the dimensions of the main body wall adjacent to said flat horizontally extending mounting flange has a major axis length of 7.34 inches, and a minor axis length of 5.64 inches.

Prior art supercharger airflow intakes use an industry standard 2.95 inch rear supercharger intake snout. The instant invention widens that to 3.67 inches thereby drastically increasing the amount of air that can be pass therethrough. Furthermore, as discussed above, the combination of interior wall angles and shapes used within the instant supercharger airflow intake and the larger supercharger intake snout reduces the turbulence of the air passing therethrough. Therefore, with more air passing therethrough with even less turbulence as prior art configurations, the instant supercharger intake airflow intake is much more efficient and the performance of the supercharger and the engine attached thereto is much greater as well.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A supercharger airflow intake for use with a supercharger installed upon a vehicle engine, said supercharger airflow intake comprising:
   a rear supercharger intake snout including:
      an airflow intake;
         wherein said airflow intake is formed having a circular shape having a diameter adapted to allow air to flow therethrough;
      a throttle body opening mounting flange;
         wherein said throttle body opening mounting flange surrounds said airflow intake;
   an outflow aperture;
   a flat horizontally extending mounting flange;
      wherein said flat horizontally extending mounting flange surrounds said outflow aperture; and
   a main body wall;
      wherein said main body wall extends between said throttle body opening mounting flange and said flat horizontally extending mounting flange and is formed in a shape that includes:
      a right side interior wall including;
         a first portion;
            wherein said first portion extends vertically from said flat horizontally extending mounting flange at an angle of 90 degrees from horizontal, and
         a second portion;
            wherein said second portion extends from said first portion to said intake snout at an angle between 59 degrees and 65 degrees thereto and has a substantially straight and smooth inner surface there along;
      a left side interior wall including;
         a first portion;
            wherein said first portion extends vertically from said flat horizontally extending mounting flange at an angle of 90 degrees from horizontal, and
         a second portion;
            wherein said second portion extends from said first portion to said intake snout at an angle of approximately 67 degrees and 73 thereto and has a substantially straight and smooth inner surface there along;

wherein said right side interior wall is spaced from said left side interior wall and located on opposite sides of said main body wall;

wherein said angles of said interior walls and said surfaces associated therewith form a shape that creates very little air turbulence when air flows from said supercharger rear intake snout to said outflow aperture.

2. The supercharger airflow intake of claim 1, wherein said diameter of said airflow intake of said rear supercharger intake snout is between 3 inches and 4 inches.

3. The supercharger airflow intake of claim 1, wherein said diameter of said airflow intake of said rear supercharger intake snout is 3.67 inches.

4. The supercharger airflow intake of claim 1, wherein said angles of said interior walls and said surfaces associated therewith along with said airflow intake of said rear supercharger intake snout and said outflow aperture form a conical-type shape.

5. The supercharger airflow intake of claim 1, wherein said supercharger airflow intake is formed from a material chosen from a group of materials consisting of stainless steel, iron, aluminum, composite resins, plastic, and ceramic.

6. The supercharger airflow intake of claim 1, wherein said supercharger airflow intake is formed from a 3D printing process.

7. The supercharger airflow intake of claim 1, wherein said supercharger airflow intake is formed from a molding process.

8. The supercharger airflow intake of claim 1, wherein said second portion of said right side interior wall extends from said first portion at an angle of 62.11 degrees.

9. The supercharger airflow intake of claim 8, wherein said second portion of said left side interior wall extends from said first portion at an angle of 69.61 degrees.

10. The supercharger airflow intake of claim 1, wherein said outflow aperture is formed having an oblong shape.

11. The supercharger airflow intake of claim 10, wherein the dimensions of said main body wall adjacent to said flat horizontally extending mounting flange has a major axis length of 7.34 inches, and a minor axis length of 5.64 inches.

* * * * *